(12) United States Patent
Okamuro

(10) Patent No.: US 7,465,246 B2
(45) Date of Patent: Dec. 16, 2008

(54) AXLE ASSEMBLY

(75) Inventor: Kenneth Okamuro, Statesville, NC (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 284 days.

(21) Appl. No.: 11/368,272

(22) Filed: Mar. 3, 2006

(65) Prior Publication Data

US 2006/0211531 A1 Sep. 21, 2006

Related U.S. Application Data

(60) Provisional application No. 60/658,721, filed on Mar. 4, 2005.

(51) Int. Cl.
*F16H 48/06* (2006.01)
(52) U.S. Cl. ....................................... 475/230
(58) Field of Classification Search ................... 475/230
See application file for complete search history.

(56) References Cited

U.S. PATENT DOCUMENTS

| | | | |
|---|---|---|---|
| 3,980,151 A * | 9/1976 | Murayama et al. | 180/261 |
| 4,301,886 A * | 11/1981 | Kinoshita et al. | 180/261 |
| 4,597,468 A | 7/1986 | Friedrich | |
| 5,041,069 A * | 8/1991 | Horst | 475/231 |
| 5,741,027 A | 4/1998 | Stroh et al. | |
| 5,810,377 A | 9/1998 | Keeler et al. | |
| 6,237,708 B1 * | 5/2001 | Kawada | 180/53.7 |
| 6,302,233 B1 | 10/2001 | Okamuro et al. | |
| 6,641,150 B1 | 11/2003 | Schlosser et al. | |
| 6,675,925 B2 * | 1/2004 | Takahashi et al. | 180/266 |
| 6,681,878 B2 * | 1/2004 | Nagata et al. | 180/233 |
| 7,290,637 B2 * | 11/2007 | Nagata et al. | 180/439 |
| 2004/0235606 A1 | 11/2004 | Brossard | |

FOREIGN PATENT DOCUMENTS

| | | |
|---|---|---|
| JP | 57-104414 | 6/1982 |
| JP | 58-008433 | 1/1983 |
| JP | 60-154913 | 8/1985 |
| JP | 05-270288 | 10/1993 |

OTHER PUBLICATIONS

JP57070734 Eng. Abstract translation unavailable, unknown.

* cited by examiner

*Primary Examiner*—Ha D. Ho
(74) *Attorney, Agent, or Firm*—Marshall & Melhorn, LLC

(57) ABSTRACT

A drive axle assembly having at least one drive shaft tube and at least one substantially horizontal drive shaft located within the tube. The drive shaft is connected at an inboard end to a differential and an outboard end of the drive shaft has a first bevel gear. The first bevel gear is meshed with a second bevel gear within a shoulder structure. The second bevel gear is located on a non-horizontal drive shaft. A selectively closeable opening is provided in the shoulder structure for installing and maintaining the bevel gears.

19 Claims, 7 Drawing Sheets

AXLE ASSEMBLY

RELATED APPLICATION

This application is claiming the benefit, under 35 U.S.C. § 119(e), of the provisional application filed Mar. 4, 2005 under 35 U.S.C. § 111(b), which was granted Ser. No. 60/658,721. This provisional application is hereby incorporated by reference in its entirety.

FIELD OF THE INVENTION

The present invention relates to an axle assembly. More specifically, the present invention relates to an axle assembly for a front drive steer axle assembly of a vehicle.

SUMMARY OF THE INVENTION

The present invention is a drive axle assembly having at least one axle arm portion, a substantially horizontal drive shaft, a non-horizontal driven shaft and a shoulder structure. The axle arm portion extends from a differential housing to the shoulder structure. The shoulder structure is integrally formed with an outboard end of the axle arm portion. The drive shaft is located within the at least one axle arm portion and it is connected at an inboard end to a differential in the differential housing. The drive shaft has a first bevel gear on an outboard end. The non-horizontal driven shaft is mounted for rotation within the shoulder structure. The driven shaft has a second bevel gear meshed in driving engagement with the first bevel gear on the drive shaft. The shoulder structure is provided with a selectively closable opening adjacent the meshed first and second bevel gears.

BRIEF DESCRIPTION OF THE FIGURES

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions or other physical characteristics relating to the embodiments disclosed are not to be considered as limiting.

Figure 1:
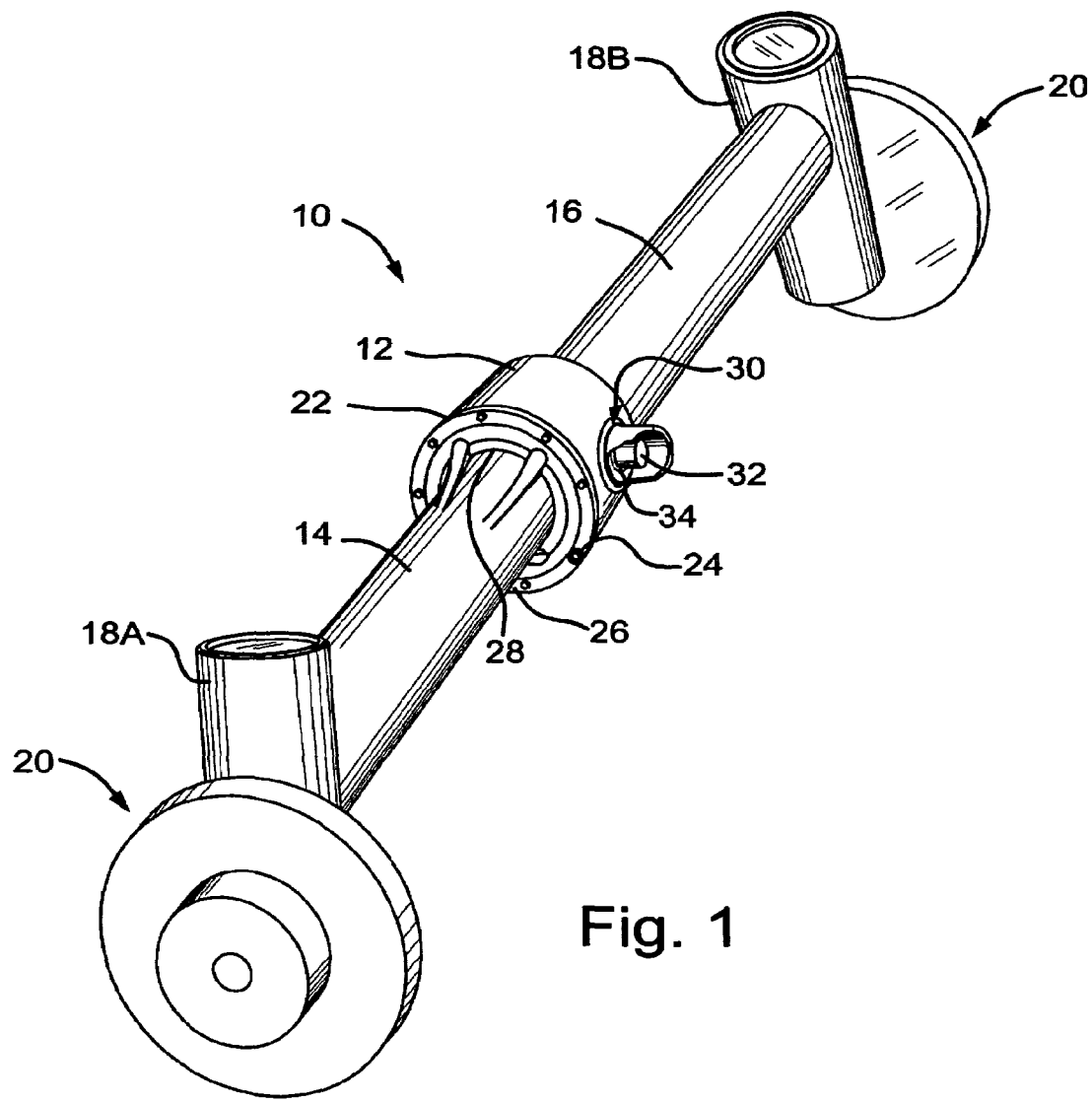
FIG. 1 is a schematic, perspective view of one embodiment of the present invention.

FIG. 1 depicts a schematic, perspective view of one embodiment of the present invention. More specifically, FIG. 1 depicts an axle assembly 10 comprising a center section 12, a first axle arm portion 14 and a second axle arm portion 16, both of which axially extend from the center section 12, and a shoulder structure 18 located at the end of each axle arm portion 14, 16. A wheel end 20, as known by those skilled in the art, is depicted adjacent each shoulder structure 18A and 18B.

The first axle arm portion 14 is secured to a housing joint 22. The first axle arm portion 14 is preferably integrally formed with the housing joint 22. It is within the scope of the present invention, however, to separately form the first axle arm portion 14 and subsequently attach it to the housing joint 22.

The housing joint 22 has a plurality of circumferentially located apertures 24 for receiving mechanical fasteners 26, such as bolts. The mechanical fasteners 26 are located through the apertures 24 and into center section 12 to secure the housing joint 22 to the center section 12.

The housing joint 22 and the first axle arm portion 14 can be secured to the center section 12 after the ring gear, pinion gears, side gears, bearings, seals, and lubricating fluid, all described in more detail below, are installed in the center section 12.

In one embodiment, one or more ribs 28, located circumferentially about the first axle arm portion 14, connect the first axle arm portion 14 with the housing joint 22, as shown in FIG. 1. Preferably, a plurality of ribs 28 that are integrally formed with both the first axle arm portion 14 and the housing joint 22 are used. Those skilled in the art will appreciate that the present invention functions equally well without the ribs 28.

The second axle arm portion 16 is preferably integrally formed with the center section 12. More preferably, the second axle arm portion 16 is one-piece with the center section 12. The second axle arm portion 16 may have a plurality of ribs (not shown) that are integrally formed with the second axle arm portion 16 and the center section 12, but the present invention is not limited to such ribs.

It is within the scope of the present invention to utilize a housing joint (not shown) to connect the second axle arm portion 16 with the center section 12. It is preferred, however, that only a single housing joint, as described above, be utilized in the present invention and that the second axle arm portion 16 is integrally formed directly with the center section 12.

Based on the above, it can be appreciated that the traditional axle housing shoulder joint connecting the axle arm portions 14, 16 to the center section 12 and the housing joint 22 have been eliminated.

The present invention includes means for accepting a power tie rod, as known by those skilled in the art (not shown), or a steer cylinder and tie rod (not shown), also as known by those skilled in the art, at each wheel end 20.

The center section 12 has an opening 30 for receiving a drive pinion shaft 32. The drive pinion shaft 32 is driven by a prime mover (not shown), such as an internal combustion engine, or the like, as known by those skilled in the art. It is preferred that at least one seal 34 be located about the drive pinion 32 adjacent the opening 30 to prevent lubricating fluids in the center section 12 from escaping.

The drive pinion shaft 32 is rotatingly mounted within the center section 12. The drive pinion shaft 32 is mounted for rotation within the center section 12 with at least two tapered bearings (not shown). Those skilled in the art will appreciate that a greater number of bearings or a fewer number of bearings may be used without departing from the scope of the invention.

Figure 2:
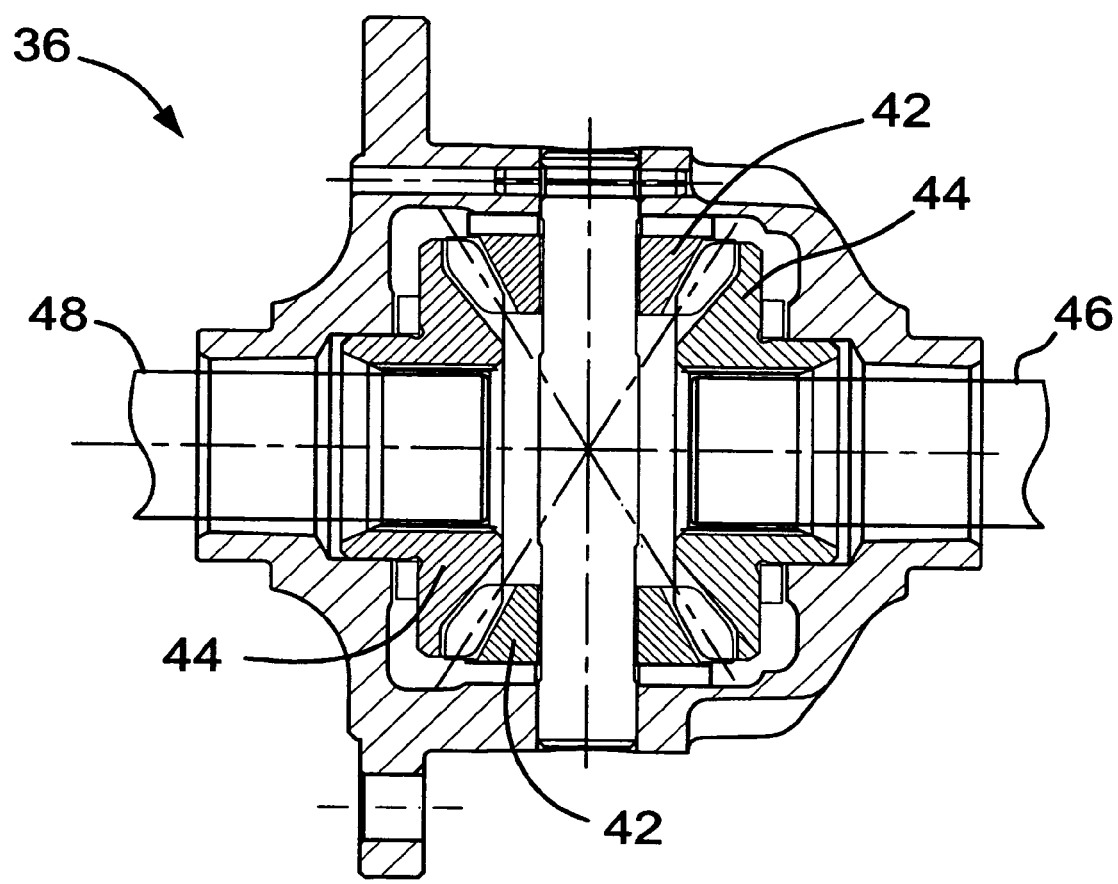
FIG. 2 is a partial schematic, cut away view of a component of the present invention.

A differential 36 for mounting in the center section 12 is depicted in FIG. 2. Those skilled in the art will appreciate that the drive pinion shaft 32 engages with a ring gear (not shown) that is secured to the differential 36.

The ring gear is drivingly connected to pinion gears 42 and side gears 44, as known to those skilled in the art, for driving a first axle shaft 46 and a second axle shaft 48. The first axle shaft 46 and the second axle shaft 48 are partially depicted in FIG. 2. Those skilled in the art will appreciate that the first axle shaft 46 and the second axle shaft 48 extend to the shoulder structures 18, as will be discussed in more detail below. The shafts 46, 48 are substantially horizontal.

Those skilled in the art will appreciate that lubricating fluid, such as oil, is located within the center section 12. Seals may be located around the first axle shaft 46 and the second axle shaft 48 to prevent the lubricating fluid from escaping from the center section 12. It is also within the scope of the present invention to allow the lubricating fluid to flow into the axle arm portions 14, 16.

Both the first and second axle shafts 46, 48 extend from the center section 12 to the shoulder structures 18A and 18B within the first axle arm portion 14 and the second axle arm portion 16, respectively. As shown in FIG. 1, the first axle arm portion 14 and the second axle arm portion 16 are preferably substantially enclosed.

The first axle arm portion 14 is preferably integrally formed with the shoulder structure 18A and the second axle arm portion 16 is preferably integrally formed with a shoulder structure 18B. More preferably, the portions 14 and 16 are integrally formed and one-piece with the shoulder structures 18A and 18B.

Figure 3:
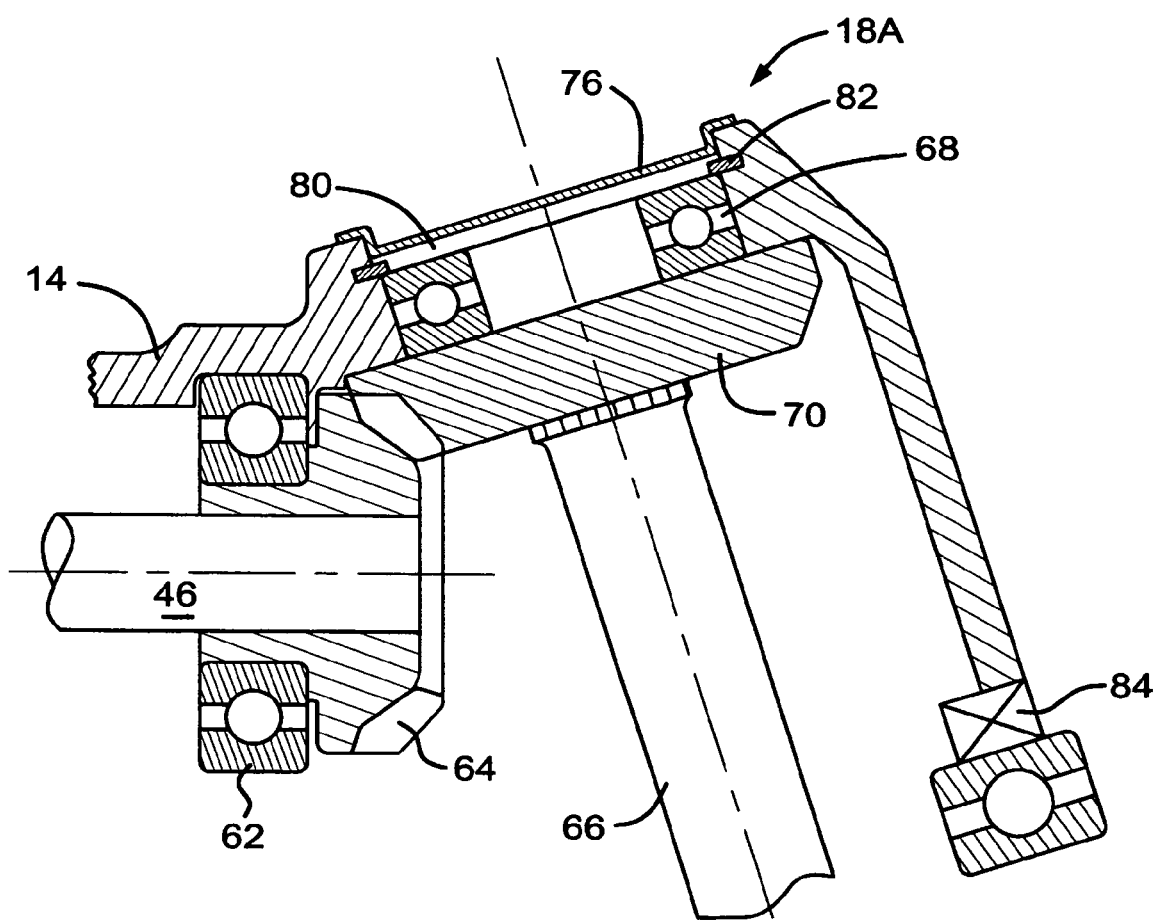
FIG. 3 is a partial schematic, cut away view of another component of the present invention.

FIG. 3 depicts a schematic, partial side view of one of the axle arm portions 14, a shoulder structure 18A and the axle shaft 46 within the axle arm portion 14. The axle shaft 46 is mounted for rotation within the axle arm portion 14 with at least one bearing 62, such as a ball bearing. The bearing 62 is preferably located inboard of the first bevel gear 64.

The end of the axle shaft 46 has a bevel gear mounted for rotation with the axle shaft 46, hereinafter called a horizontal bevel gear 64. It should be appreciated that the axle arm portions 16 and axle shaft 48 are connected to the shoulder structure 18B in a similar manner. In light of the similarity between the two sides of the axle assembly 10, only one side will be described and depicted below and in the accompanying figures.

FIG. 3 also depicts a non-horizontal or a vertically oriented shaft 66 mounted for rotation within the shoulder structure 18A. A least one bearing 68, such as a ball bearing, is located between the shaft 66 and the shoulder structure 18A to facilitate rotation of the shaft 66. More specifically, it is preferred that the bearing 68 is located above the second bevel gear 70. The bearing 68 is held in place by a snap ring 82. The vertically oriented shaft 66 has a bevel gear mounted for rotation with the shaft, hereinafter called a vertical bevel gear 70.

In the preferred embodiment depicted in FIG. 3, the vertical bevel gear 70 and the horizontal bevel gear 64 are meshed with one another to provide drive to the shaft 66. In a most preferred embodiment, the vertical bevel gear 70 is located above the horizontal bevel gear 64.

FIG. 3 also depicts a first cover 76 located over a hole 80 in the shoulder structure 18A. The first cover 76 is preferably formed of a stamped metal material and secured in place by a press fit and sealed with sealant. The covers 76 may be secured to the shoulder structure 18A with mechanical fasteners, interlocking elements and/or friction fittings, by way of example only. Regardless of the above-mentioned methods of attachment of the cover 78 to the shoulder structure 18A, it is preferred that the cover 78 be removably secured for purposes of maintenance and repair.

The hole 80 permits installation of the bearing 62 for the axle shaft 46 and the horizontal bevel gear 64 on the axle shaft 46. Additionally, the hole 80 permits installation of the bearing 68, shaft 66 and vertical bevel gear 70. Without the hole 80, installation of the above-described items in the integrally formed shoulder structure 18A would be difficult and costly.

Those skilled in the art will appreciate that lubricating fluid is located in the shoulder structure 18A. As shown in FIG. 3, a seal 84 is preferably located about the shaft 66 to prevent the lubricating fluid from escaping from the shoulder structure 18A. The seal 84 may be such a greased-for-life seal and the lubricating fluid may be grease or oil. All seals identified below may be such as the above-described seal.

A bevel gear (not shown) is located at the end of the shaft 66 to mesh with a bevel gear (not shown) of the wheel end 20 to provide drive to the wheel end components, as known by those skilled in the art.

It should be appreciated that the axle arm portion 14 permits communication of lubricating fluid between the center section 12 and the shoulder structure 18A. The axle arm portion 16 similarly communicates lubricating fluid between the center section 12 and the shoulder structure 18B associated with the axle arm portion 16.

Figure 4:
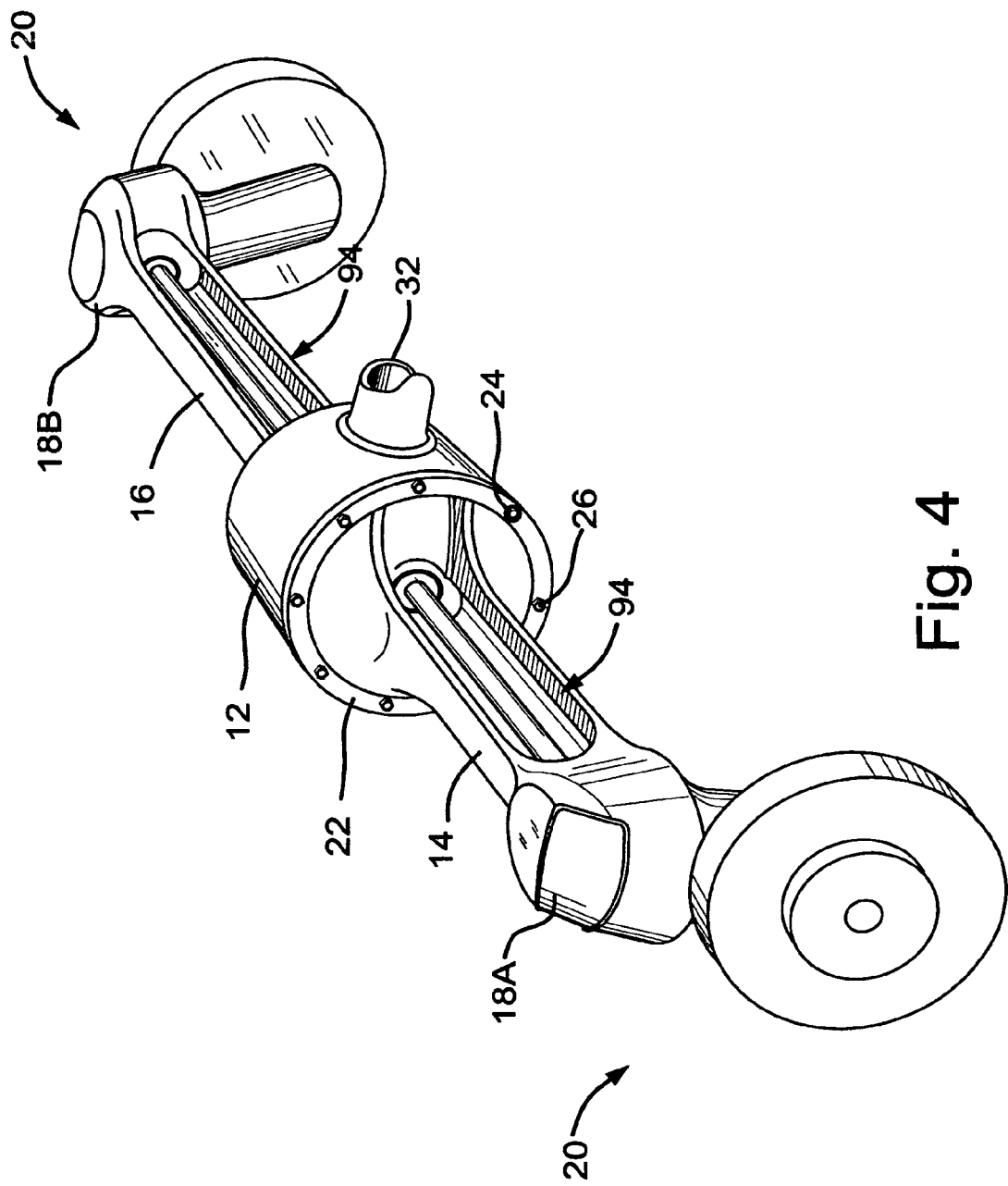
FIG. 4 is a schematic, perspective view of another embodiment of the present invention.

FIG. 4 is a schematic, perspective view of yet another embodiment of the present invention. The invention depicted in FIG. 4 is substantially identical to the above-described invention except as indicated below.

As depicted in FIG. 4, the first and second axle arm portions 14, 16 are preferably not fully enclosed. More preferably, the first and second axle arm portions 14, 16 are comprised of a top portion 40, a bottom portion 50, a forward portion 52 and a rearward portion 94. Preferably, the top portion 40, the bottom portion 50 and the forward portion 52 are substantially closed. The rearward portion 94 of the first and second axle arm portions 14, 16 is open.

Figure 5:
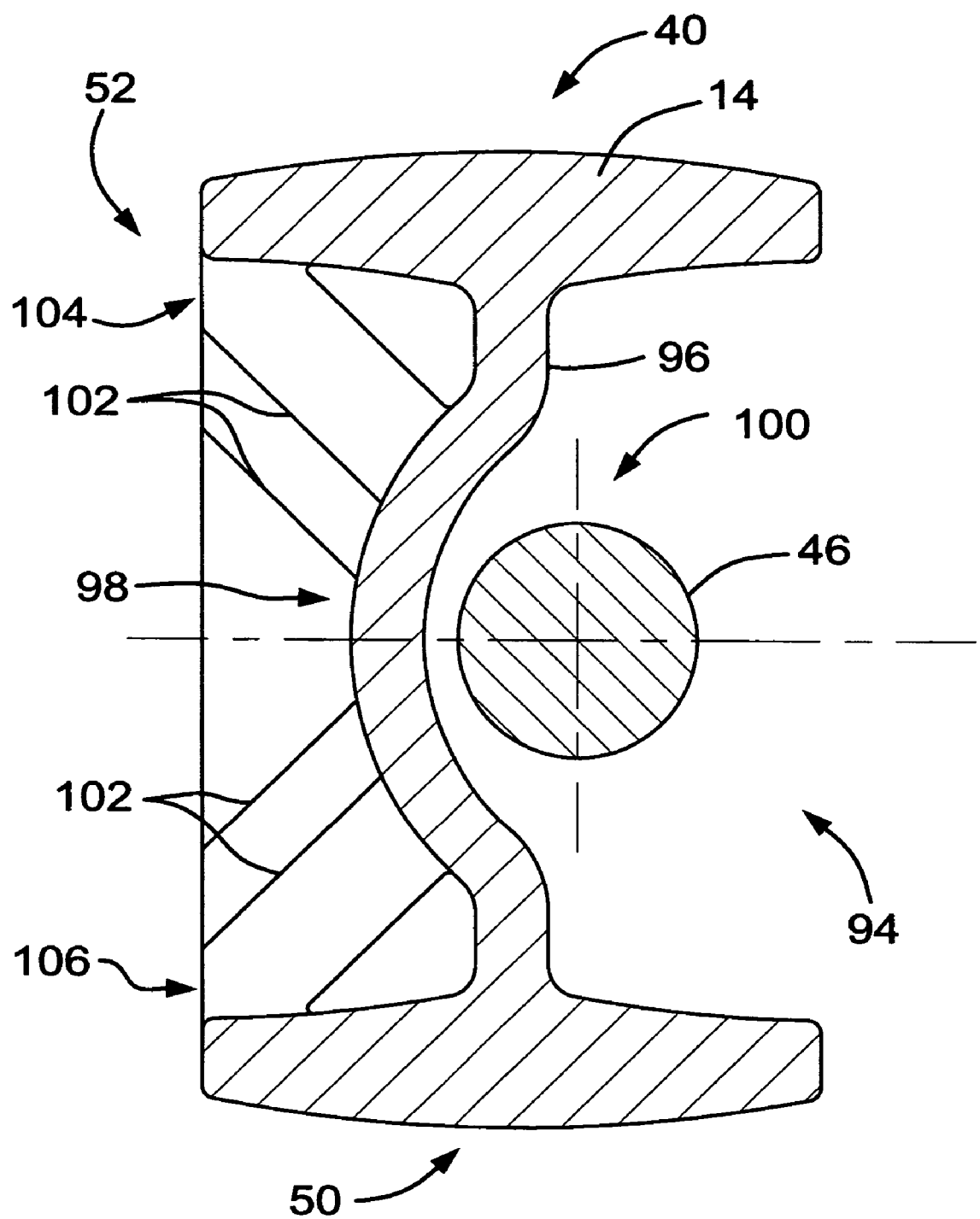
FIG. 5 is a schematic, side view of a component of the invention depicted in FIG. 4.

A schematic side view of one of the axle arm portions 14 is depicted in FIG. 5. The axle shaft 46 is shown adjacent a wall 96 of the axle arm portion 14. The wall 96 preferably has an outwardly extending bow 98 to accommodate the axle shaft 46. Preferably, the axle shaft 46 is located on the backside 100 of the wall 98.

It should be appreciated that the present discussion of the axle arm portion 14, its associated axle shaft 46 and the shoulder structure 18A applies equally to the axle arm portion 16, its associated axle shaft 48 and its shoulder structure 18B on the other side of the center section 12.

One or more strengthening ribs 102 may be connect the wall 96 with an upper and/or a lower portion 104, 106 of the axle arm portion 14, as shown in FIG. 5. It should be appreciated, however, that the present invention works equally well without the ribs.

In yet another embodiment, a plate (not shown), such as a metal stamping, may be located across the rearward portion 94 of the axle arm portion 14 to protect and shield the axle shaft 46.

Those skilled in the art will appreciate that the present invention is not limited to the preferred embodiment of the open axle arm portion depicted in the Figures. Other open axle arm portions are well within the scope of the present invention.

Figure 6:
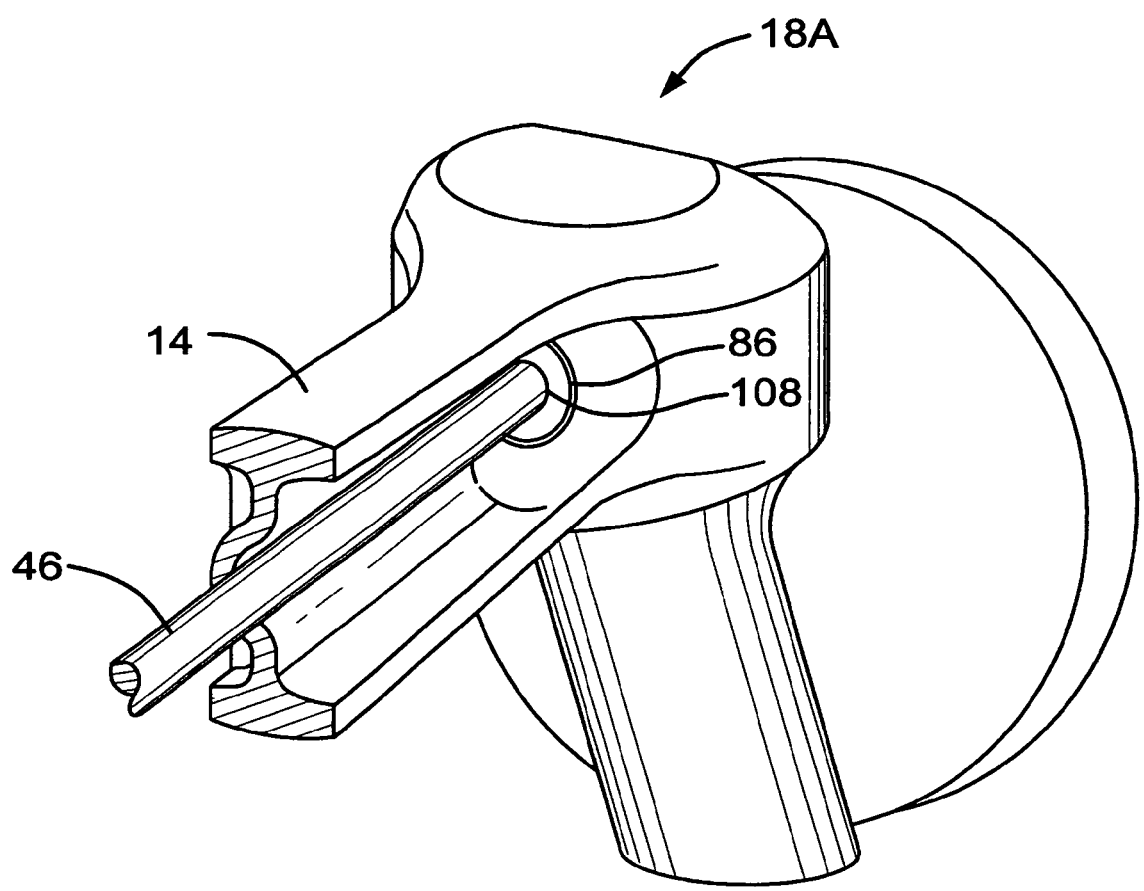
FIG. 6 is a schematic, perspective partial view of a component of the invention depicted in FIG. 4.

As best seen in FIG. 6, the axle shaft 46 extends to the shoulder structure 18A and enters the shoulder structure 18A through an aperture 108. Preferably, a seal 86 is located adjacent the aperture 108 to prevent lubricating fluid from escaping from the shoulder structure 18A.

One axle shaft also extends through an aperture (not shown) in the housing joint 22. Preferably, a seal (not shown) is located about the axle shaft adjacent the aperture to contain the lubricating fluid in the center section 12. Additionally, the other axle shaft extends through an aperture (not shown) in the center section 12. It is also preferred that a seal (not shown) is located about that axle shaft adjacent the aperture to contain the lubricating fluid in the center section 12.

Figure 7:
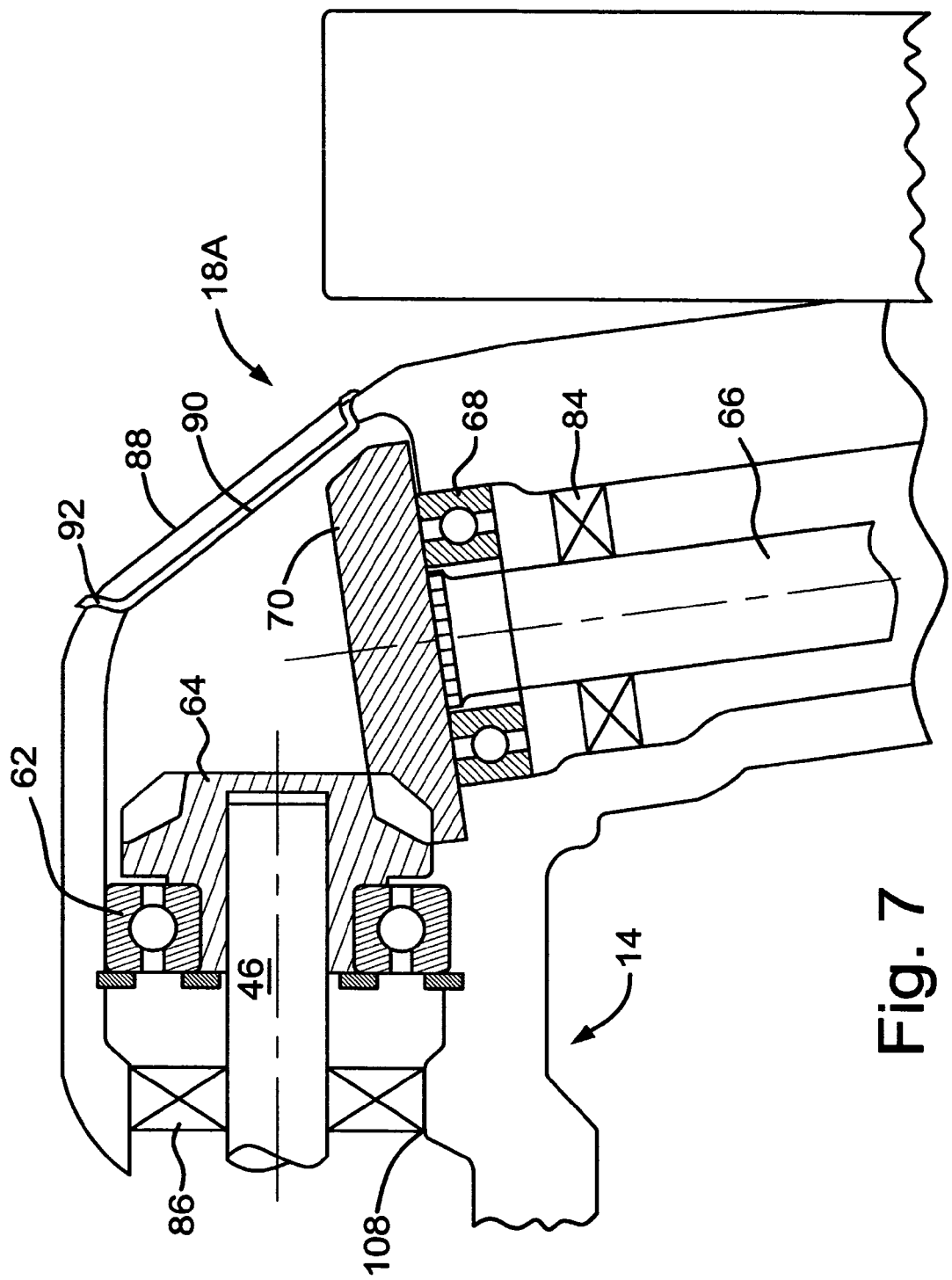
FIG. 7 is a schematic, partial side view of the component depicted in FIG. 6.

A partial, cut-away side view of the shoulder structure 18A is schematically shown in FIG. 7. In FIG. 7, the open axle arm portion 14 and the axle shaft 46 are depicted. The seal 86 is shown about the axle shaft 46 adjacent the bearing 62 for the axle shaft 46. The axle shaft 46 has a bevel gear, referred herein as a horizontal bevel gear 64, that meshes with a bevel gear, referred herein as a vertical bevel gear 70, of a vertically oriented shaft 66. As shown in FIG. 7, the vertical bevel gear 70 is located below the horizontal bevel gear 64. A bearing 68 and a seal 84 are located about the vertically oriented shaft 66.

A cover 88, preferably constructed of stamped metal, is secured to the shoulder structure 18A over a hole 90. The cover 88 is secured to the shoulder structure 18A preferably with a press fit and sealant. The cover 88 may also be secured to the shoulder structure 18A with one or more mechanical fasteners. As described above, the hole 90 allows for installation of the axle shaft 46, bearings 62, 68, seals 84, 86, and bevel gears 64, 70 in the shoulder structure 18A. Regardless of which method is used to attach the cover 88 to the shoulder structure 18A, it is preferred that the cover 88 be removably attached for purposes of repair and maintenance.

In light of the above, it can be appreciated that the lubricating fluid in the shoulder structures 18A and 18B and the lubricating fluid in the center section 12 is in not communication with one another. Additionally, it can be appreciated that there is no lubricating fluid in the first or second axle arm portions 14, 16.

It can be appreciated that for the embodiment of the invention depicted in FIGS. 4-7, by not having any lubricating fluid in the axle arm portions 14, 16, the lubricating fluid required for the axle assembly 10 is reduced and the amount of churning experienced by the lubricating fluid is reduced. Reducing the churning of the lubricating fluid in the shoulder joints 18A, 18B reduces the amount of heat generated and reduces parasitic losses in the shoulder joints 18A, 18B and the wheel ends 20.

In accordance with the provisions of the patent statutes, the present invention has been described in what is considered to represent its preferred embodiments. However, it should be noted that the invention can be practiced otherwise than as specifically illustrated and described without departing from its spirit or scope.

I claim:

1. A drive axle assembly, comprising:
   at least one axle arm portion extending from a differential housing to a shoulder structure that is integrally formed with an outboard end of said axle arm portion;
   a substantially horizontal drive shaft located within said at least one axle arm portion connected at an inboard end to a differential in said differential housing and having a first bevel gear on an outboard end; and
   a non-horizontal driven shaft mounted for rotation within said shoulder structure, said driven shaft having a second bevel gear meshed in driving engagement with said first bevel gear on said drive shaft;
   wherein said shoulder structure is provided with an upper selectively closable opening with a non-steerable removable cover having a planar central portion with a concentric rim transversally extending outwardly from said central portion about a perimeter of said cover, adjacent said meshed first and second bevel gears.

2. The assembly of claim 1, wherein a first axle arm portion and a second axle arm portion extend from said differential housing and said first axle arm portion is mechanically connected to said differential housing and said second axle arm portion is integrally formed and one-piece with said differential housing.

3. The assembly of claim 2, wherein said first axle arm portion comprises a housing joint for mechanically connecting said first axle arm portion to said differential housing and a plurality of ribs that connect said first axle arm portion with said housing joint.

4. The assembly of claim 1, wherein said drive shaft is supported for rotation within said at least one axle arm portion by at least one bearing located inboard of said first bevel gear and said non-horizontal driven shaft is supported for rotation within said shoulder structure by at least one bearing located above said second bevel gear.

5. The assembly of claim 1, wherein said selectively closable opening is located above said second bevel gear bearing in said shoulder structure, said opening permitting installation of said bearing, said second bevel gear and said non-horizontal driven shaft within said shoulder structure.

6. The assembly of claim 5, wherein said removable cover is located in said selectively closable opening.

7. The assembly of claim 1, wherein said differential housing, said at least one axle arm portion and said shoulder structure are in fluid communication with one another so that lubricating fluid can freely flow from said differential housing, through said at least one axle arm portion to said shoulder structure and vice versa.

8. The assembly of claim 1, wherein said first bevel gear is located below said second bevel gear.

9. A drive axle assembly, comprising:
   at least one axle arm portion extending from a differential housing to a shoulder structure that is integrally formed with an outboard end of said axle arm portion, said axle arm portion having a top portion, a bottom portion, a forward portion and an open rearward portion; and
   a substantially horizontal drive shaft located behind said forward portion;
   wherein said shoulder stricture is provided with an upper selectively closable opening with a non-steerable removable cover having a planar central portion with a concentric rim transversally extending outwardly from said central portion about a perimeter of said cover, adjacent meshed first and second bevel gears.

10. The assembly of claim 9, wherein said forward portion connects said top portion and said bottom portion and wherein said forward portion, said top portion and said bottom portion are substantially closed.

11. The assembly of claim 9, wherein said forward portion has an outwardly extending bow to accommodate said drive shaft.

12. The assembly of claim 9, wherein said shoulder structure houses said first bevel gear mounted on an outboard portion of said drive shaft and said shoulder structure houses said second bevel gear mounted on a non-horizontal driven shaft.

13. The assembly of claim 9, wherein a first seal is located about said drive shaft in said shoulder structure and a second seal is located about a driven shaft in said shoulder structure so that lubricating fluid is sealed within said shoulder structure.

14. The assembly of claim 9, wherein said drive shaft is rotatably mounted within said shoulder structure by at least one bearing and a driven shaft is rotatably mounted within said shoulder structure by at least one bearing.

15. The assembly of claim 9, wherein said first bevel gear is located above said second bevel gear in said shoulder structure.

16. The assembly of claim 9, further comprising first and second bearings and first and second seals, wherein said opening permitting installation of said first bearing, said second bearing, said first seal, said second seal, said first bevel gear and said second bevel gear, said opening being closed by said removable cover.

17. A drive assembly for a vehicle, comprising:

an axle arm portion housing a substantially horizontal drive axle;

a shoulder structure integrally formed with said axle arm portion;

a first bevel gear mounted on an outboard portion of said drive axle within and adjacent said shoulder structure; and a second bevel gear mounted on a non-horizontal driven axle, said second bevel gear being in mesh with said first bevel gear substantially above said first bevel gear within and adjacent said shoulder structure;

wherein said shoulder structure is provided with an upper selectively closable opening with a non-steerable removable cover having a planar central portion with a concentric rim transversally extending outwardly from said central portion about a perimeter of said cover.

18. The assembly of claim 17, wherein said axle arm portion and said shoulder structure are one-piece.

19. The assembly of claim 17, wherein said shoulder structure and said axle arm portion communicate lubricating fluid between them.

* * * * *